(12) United States Patent
Darie et al.

(10) Patent No.: US 12,190,136 B2
(45) Date of Patent: *Jan. 7, 2025

(54) DEVICE NAVIGATIONAL MAPS FOR CONNECTED DEVICES

(71) Applicant: Omnissa, LLC, Mountain View, CA (US)

(72) Inventors: Florin Darie, Middletown, NJ (US); Deepak Gonsalves, Bridgewater, NJ (US); Pooja Chengappa, Bridgewater, NJ (US)

(73) Assignee: Omnissa, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,756

(22) Filed: Apr. 28, 2023

(65) Prior Publication Data

US 2023/0266982 A1     Aug. 24, 2023

Related U.S. Application Data

(63) Continuation of application No. 17/745,057, filed on May 16, 2022, now abandoned, which is a continuation of application No. 15/423,312, filed on Feb. 2, 2017, now Pat. No. 11,340,920.

(60) Provisional application No. 62/290,192, filed on Feb. 2, 2016.

(51) Int. Cl.
*G06F 9/451*     (2018.01)
*G06F 9/445*     (2018.01)
*G06F 11/30*     (2006.01)
*G06F 16/904*    (2019.01)

(Continued)

(52) U.S. Cl.
CPC ............ *G06F 9/453* (2018.02); *G06F 9/4451* (2013.01); *G06F 11/302* (2013.01); *G06F 16/904* (2019.01); *G06F 9/455* (2013.01); *G06F 11/3006* (2013.01); *G06F 11/3684* (2013.01); *G06F 11/3696* (2013.01)

(58) Field of Classification Search
CPC ...... G06F 9/453; G06F 9/4451; G06F 11/302; G06F 16/904; G06F 9/455; G06F 11/3006; G06F 11/3684; G06F 11/3696
See application file for complete search history.

(56) References Cited

U.S. PATENT DOCUMENTS 5,675,752 A * 10/1997 Scott .................... G11B 27/034
                                                                     715/202
11,340,920 B2 * 5/2022 Darie .................... G06F 16/904
(Continued)

OTHER PUBLICATIONS

Duda, C., et al., Ajax crawl: Making Ajax applications searchable. In Proceedings of the 25th International Conference on Data Engineering (ICDE '09). IEEE Computer Society, Los Alamitos, CA 78-89 (2009).

*Primary Examiner* — Justin R. Blaufeld
(74) *Attorney, Agent, or Firm* — Kim & Stewart LLP

(57) ABSTRACT

Described herein is a method for creating and utilizing device navigational maps. The device navigational maps are modeled using directed graphs that contain detailed information of all components on the connected devices. An application systematically scans through the entire connected device and builds a detailed data model of the connected device, which is used as the navigational map.

20 Claims, 17 Drawing Sheets

(51) Int. Cl.
  *G06F 9/455* (2018.01)
  *G06F 11/36* (2006.01)

(56) References Cited

U.S. PATENT DOCUMENTS

| | | | | |
|---|---|---|---|---|
| 2006/0101347 A1* | 5/2006 | Runov | G06F 16/10 | 715/764 |
| 2006/0184880 A1* | 8/2006 | Bala | G06F 9/453 | 715/708 |
| 2008/0195942 A1* | 8/2008 | Marsyla | G06F 9/451 | 715/773 |
| 2010/0275155 A1* | 10/2010 | Kawashima | G06F 9/451 | 715/802 |
| 2011/0258584 A1* | 10/2011 | Williams | G06F 3/04817 | 715/810 |
| 2014/0052433 A1* | 2/2014 | Prasad | G06F 8/74 | 703/22 |
| 2014/0075371 A1* | 3/2014 | Carmi | G06F 9/451 | 715/781 |
| 2014/0298297 A1* | 10/2014 | Prasad | G06F 11/3684 | 717/125 |
| 2014/0359371 A1* | 12/2014 | Schur | G06F 11/3684 | 714/38.1 |
| 2015/0116769 A1* | 4/2015 | Nakagawa | G06F 3/0482 | 345/173 |
| 2015/0193546 A1* | 7/2015 | Lipton | G06F 9/445 | 717/178 |
| 2015/0242422 A1* | 8/2015 | Shapira | G06F 16/954 | 707/722 |
| 2016/0188448 A1* | 6/2016 | Sankaranarasimhan | G06F 11/3688 | 717/128 |
| 2016/0253422 A1* | 9/2016 | Shapira | G06F 16/9537 | 707/706 |
| 2016/0335286 A1* | 11/2016 | Desineni | H04L 67/02 | |
| 2016/0335333 A1* | 11/2016 | Desineni | G06F 16/24556 | |
| 2016/0335348 A1* | 11/2016 | Desineni | G06F 16/951 | |
| 2016/0335349 A1* | 11/2016 | Desineni | G06F 16/9538 | |
| 2016/0335356 A1* | 11/2016 | Desineni | G06F 16/1748 | |

* cited by examiner

800. Graph

810. List of vertices

820. List of edges

830. Device information

- Device Make
- Device Model
- OS version
- Software version

Figure 8

DEVICE NAVIGATIONAL MAPS FOR CONNECTED DEVICES

CROSS-REFERENCE TO RELATED APPLICATIONS

This application is a continuation of, and claims the benefit of and priority to, co-pending U.S. application Ser. No. 17/745,057, entitled "DEVICE NAVIGATIONAL MAPS FOR CONNECTED DEVICES", and filed on May 16, 2022, which claims priority to U.S. patent application Ser. No. 15/423,312, entitled "DEVICE NAVIGATIONAL MAPS FOR CONNECTED DEVICES," and filed on Feb. 2, 2017, which in turn claims the benefit of and priority of U.S. Provisional Application No. 62/290,192, filed on Feb. 2, 2016, which are incorporated herein by reference in their entirety.

TECHNICAL HELD

This application is related to connected devices and, in particular, to creation and utilization of device navigational maps for the connected devices.

SUMMARY OF THE INVENTION

Described herein is a method for creating and utilizing device navigational maps. The device navigational maps are modeled using directed graphs that contain detailed information of all elements on connected devices. The term connected device may refer to, but is not limited to, mobile devices, smartphones, personal digital assistants (PDAs), smart televisions, tablets, set-top boxes, and the like.

The device navigational maps may be used for building connected device simulators, educational tutorials, interactive guidance systems for connected devices, capturing the user actions on the connected devices when assistance is needed, creating analytics on usage of connected device components and capturing and analyzing user behavior on the connected devices. Device navigational maps may also be used to create diagnostic fixes on the connected device for commonly faced connected device issues.

A navigational map is a hierarchical graphical representation of a specific area or the entire software running on the connected device along with the actions that may need to be performed in order to navigate within a structure or architecture of the connected device. Maps stand out as an efficient, effective method of recording, storing, and transferring information.

One of the primary benefits of device navigational maps is the ability to utilize them in creating comprehensive interactive guidance tools for connected devices as described in U.S. patent application Ser. No. 14/042,846, filed Oct. 1, 2013, and entitled "METHOD AND APPARATUS FOR INTERACTIVE MOBILE DEVICE GUIDANCE", which is herein incorporated by reference. The interactive guidance system has the capability to instruct and guide end users of connected devices to navigate through its various functions and configurations.

Another benefit of the device navigational maps is the ability to use them in creating connected device tutorials dynamically. The move towards improved customer care and guidance post connected device sale underscores a growing need to educate customers of the new features of connected devices. The carriers and connected device manufacturers utilize this as a way to build customer loyalty, lower the turnover and product return rate, sell additional accessories, and stand out in a sea of retail options. These services are more important than ever as the market evolves past early adopters and technology enthusiasts. Since the navigation maps have information about all the components of the connected device and information on how to navigate to different components and software configurations, connected device software related tutorials can be developed dynamically on the connected device where the navigational maps are installed.

Another benefit of the device navigational map is the ability to use them in creating connected device simulators. A connected device simulator allows a user to verify the functionality of device operating systems and mobile applications across different mobile platforms, such as iPhone®, iPad®, Android® and BlackBerry®, (each term being a trademark of Apple, Google and Blackberry, respectively), without actually having the connected devices in hand. Connected device simulators can help both the device users and the customer service agents to become familiar with the device user interface, device system configuration, and most common applications running on the connected device without having a physical device. By providing a search engine that works in conjunction with the navigation maps and input keywords, an agent can easily find and navigate to any system configuration screens, application settings and similar information. A comprehensive map of the connected device layout and structure helps in creating device simulators of varying complexities with ease.

Another benefit of the device navigational maps is the ability to capture and analyze customer usage, behavior and preferences on a connected device in order to develop detailed analytics that will help in further improving the connected devices. This capability could also be extended to generate analytics on the navigation patterns and user experience latency of any mobile application. This is particularly useful to application developers in improving their overall application user experience. During the last decade, connected devices have gained popularity all over the world and this popularity continues to grow. The key differences between connected devices and earlier connected phones are full-featured internet access and easy availability of new applications through modern operating system (OS) platforms and app stores. Understanding the application and service usage of customers is an important step in designing applications and systems on which the applications run. The device navigational maps provide good data capturing methods that can be used for archiving and analyzing usage patterns.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 8 shows an exemplary structure of the navigational graph;

DETAILED DESCRIPTION

Described herein is a method for creating and utilizing device navigational maps for connected devices. An application systematically scans through the entire connected device and builds a detailed data model of the connected device, which is used as a navigational map (NM). A navigational map is a directional graph containing details of all the elements on the connected device and meta information associated with those elements. The term connected device may refer to, but is not limited to, mobile devices, smartphones, personal digital assistants (PDAs), smart televisions, tablets, set-top boxes, and the like.

Figure 1:
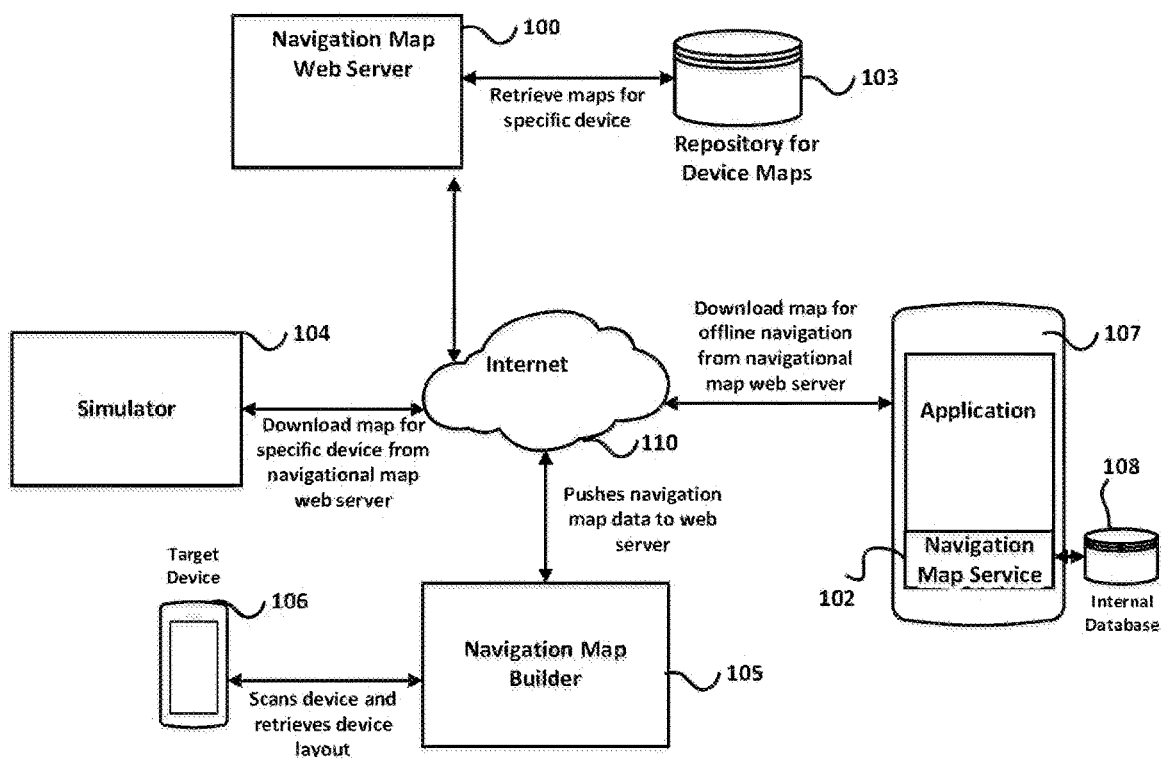
FIG. 1 describes the system architecture of the device navigation system with the navigation map service running within a connected device.

FIG. 1 describes the system architecture of the device navigation system in detail. The device navigation system contains the following main components: a Navigation Map [NM] Web Server 100, Navigation Map Service 102, Database for device maps/navigation map repository 103 and Navigation Map Builder 105. The following additional components are used in utilizing the device navigation maps: Simulator 104 and the application which is hosted within a remote device 107 for the purpose of providing navigation service. All components of the system communicate with each other over the air though an internet connection 110, which may be wired, wireless or combination thereof, as appropriate. The navigation map is implemented in a graph form.

The Navigation Map web server 100 is a RESTful AR that provides secure access to the navigation map repository 103. All navigational maps built on a target device 106 are stored in database navigation map repository 103.

Figure 1A:
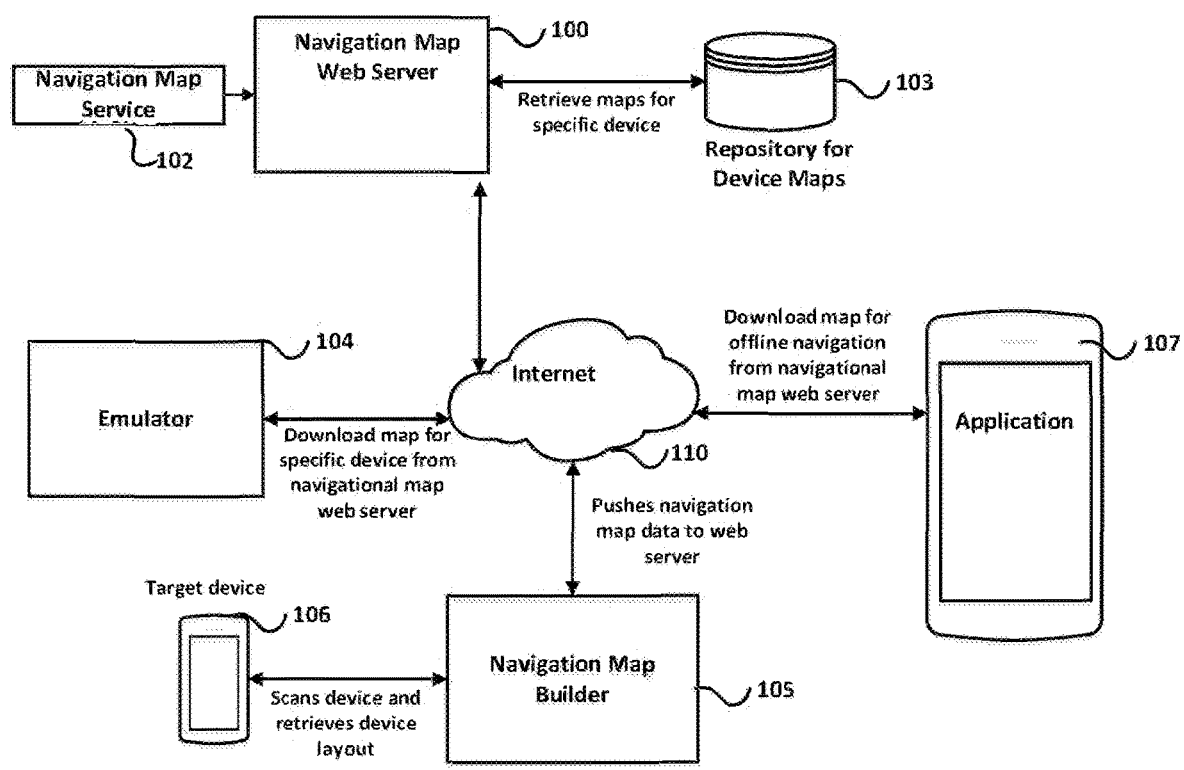
FIG. 1a describes the system architecture of the device navigation system with the navigation map service running on an external personal computer (PC) or server.

The Navigation Map service 102 may reside on the connected device, as shown in FIG. 1. The Navigation Map service 102 may also reside in an external system like a remote server. This is shown in FIG. 1a.

Figure 1B:
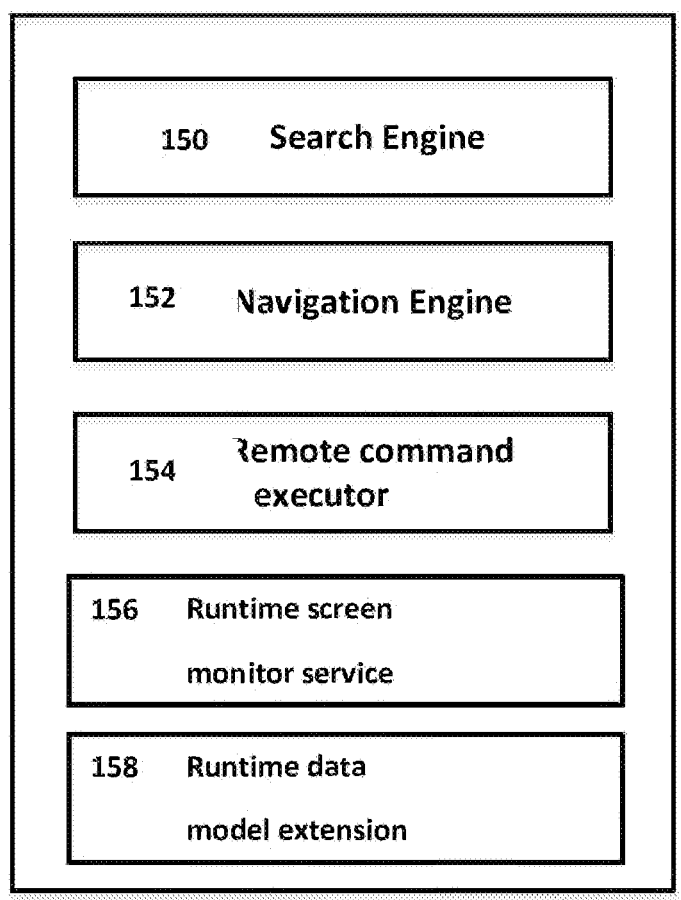
FIG. 1b describes the navigation map service in detail.

FIG. 1b describes the Navigation Map Service 102. The Navigation Map Service 102 contains a search engine 150, a navigation engine 152, a remote command executor 154, a runtime screen monitor service 156 and a runtime data model extension 15g. The search engine 150 uses keywords provided by the user and provides a list of screens which contain the provided keywords. Based on the collected image and the screen layout information, the Navigation Map Service 102 is able to highlight the screen areas which contain the provided keywords.

Given a start screen and a destination screen, the navigation engine 152 computes the path and navigates through the path directly on the connected device. There are two modes of navigating: automatic mode and manual mode. In automatic mode, the map building tool analyzes the current screen and automatically tries to expand the navigational map by invoking the screen elements using the remote command executor. The remote command executor 154 listens to commands received from the navigation map builder 105, for example, and executes it on the connected device.

The commands are based on the navigation map. The navigation map contains what commands are needed to be performed for each step. The remote command executer 154 executes the commands on the device to show the user how the action is done. For example, for a "How do I turn on wifi", the command could be in this form—tap at x,y on the screen, turn on switch or scroll on page downwards. The commands are used to invoke user interface (UI) elements on the screen without user involvement.

The remote command executor 154 executes the received commands, such as tapping on a specific co-ordinate on the device screen, scrolling through the device screen or activating specific hardware and software buttons on the connected device. The runtime screen monitor service 156, if activated, watches the current device screen and matches the current device screen with the prebuild navigation graph. The runtime data model extension 158, if activated, expands the NM graph at the runtime with vertices and edges built with the screen which are not already present in the graph. The NM map service 102 also synchronizes the local NM graph on the connected device with the central NM graph stored on the remote server database 103, for example.

In manual mode, for each navigation step, the user is guided on where and which action to take directly on the connected device. In particular, the user is instructed on which action to take (by highlighting the UI element on the screen) and the user will take the action. In this case the remote command executor 154 is not involved.

Referring back to FIGS. 1 and 1a, the Navigation Map (NM) builder 105 builds new device maps by scanning the target device 106, (which is a sample connected device), and retrieving the structural layout of the target device 106. The process used by the NM builder 105 in creating new navigation maps is described in detail in FIGS. 5 and 6. The maps built by the NM builder 105 are then sent to the NM web server 100 to be stored in the device map repository 103.

The Simulator 104 utilizes a search engine that works in conjunction with the navigation maps and input keywords, to act as a device simulator. It downloads navigation maps for a specific device from the NM web server 100. The device navigation maps can also be utilized as an interactive navigation system within a connected device, for example, connected device 107. This could be achieved by integrating the Navigation map service 102 with an application on the connected device 107 or by using the NM service as a standalone service. The NM service 102 downloads maps from the NM web server 100 and stores it in an internal database 108 for offline navigation. If the NM service 102 is configured to expand on the NM graph during runtime, any data accumulated in this process is stored in the internal database 108 and synchronized with the central repository 103.

The Navigation map builder 105, which is utilized to build the device navigational map on the target device 106, could either reside or be implemented on a personal computer or a secure server. The application could remotely scan the device by using a remote control connection or the target device 106 could be connected to the computer by means of a tethered connection or untethered connection such as Wi-Fi, Bluetooth® or the like. This is described in more detail in FIG. 3. Alternatively, the Navigation map builder 105 could be installed within the target device 106 to perform the same operation of traversing and scanning the entire device to collect data which could then be used to build the device navigation map. This is described in more detail in FIG. 2. In summary, there are 2 ways to get data: 1) offline mode, where scanning and collected data are both hosted on the connected device; and 2) online mode, where scanning is on the connected device but the collected data is stored on a remote location.

Figure 2:
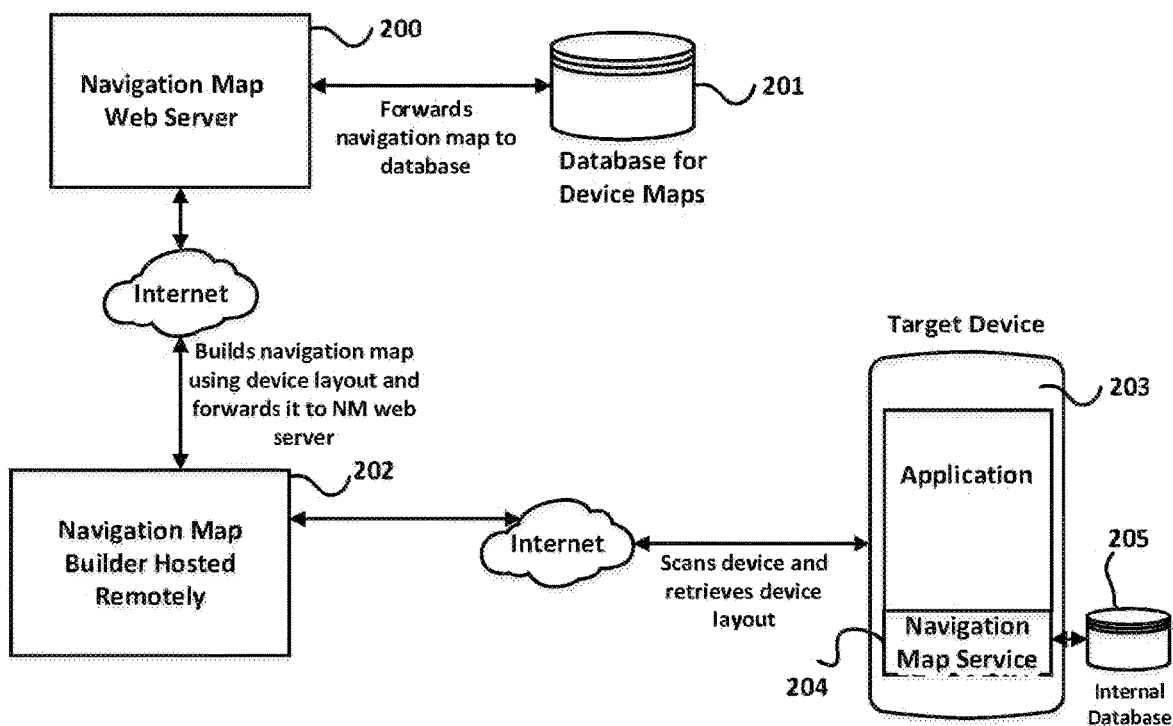
FIG. 2 describes the device navigation system with navigation map builder hosted in an external system.

FIG. 2 describes a system where the navigation map builder 202 is hosted on a remote machine which could be personal computer or a secure server. The NM builder 202 communicates with the NM service 204 over the air though an internet connection. In an implementation, the internet connection can be via wired connections. The NM service 204 scans the entire connected device 203 and retrieves the device layout. The NM service 204 then sends the scanned device layout to the NM Builder 202. A copy of this information is stored within the Internal Database 205. Using the data retrieved from the connected device 203 via the NM service 204, the NM builder 202 builds out a navigational map graph as described in FIG. 4. The NM graph is forwarded to the NM web server 200 and stored in the central data repository 201 for all navigation maps.

Figure 3:
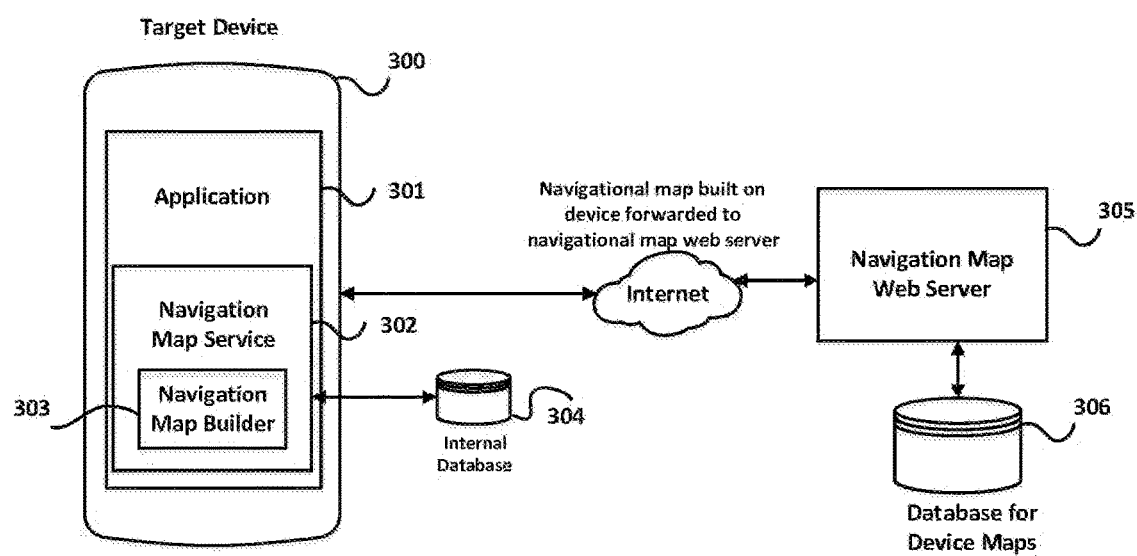
FIG. 3 describes the device navigation system with the navigation map builder hosted within a connected device on which the navigation map is built.

FIG. 3 describes a system where the navigation map builder 303 resides and operates on a connected device 300 on which the navigation map is built. The Navigation Map Budder 303 could reside within the Navigation Map service 302, which could be a part of an application 301 or a standalone service within the device 300. The NM builder 303 uses the process described in FIG. 5 to build a NM graph of the host connected device 300 and stores it in the internal database 304. The NM graph built on the device 300 is forwarded to the NM web server 305 to be synchronized with the central repository 306 for device navigation maps.

Figure 4:
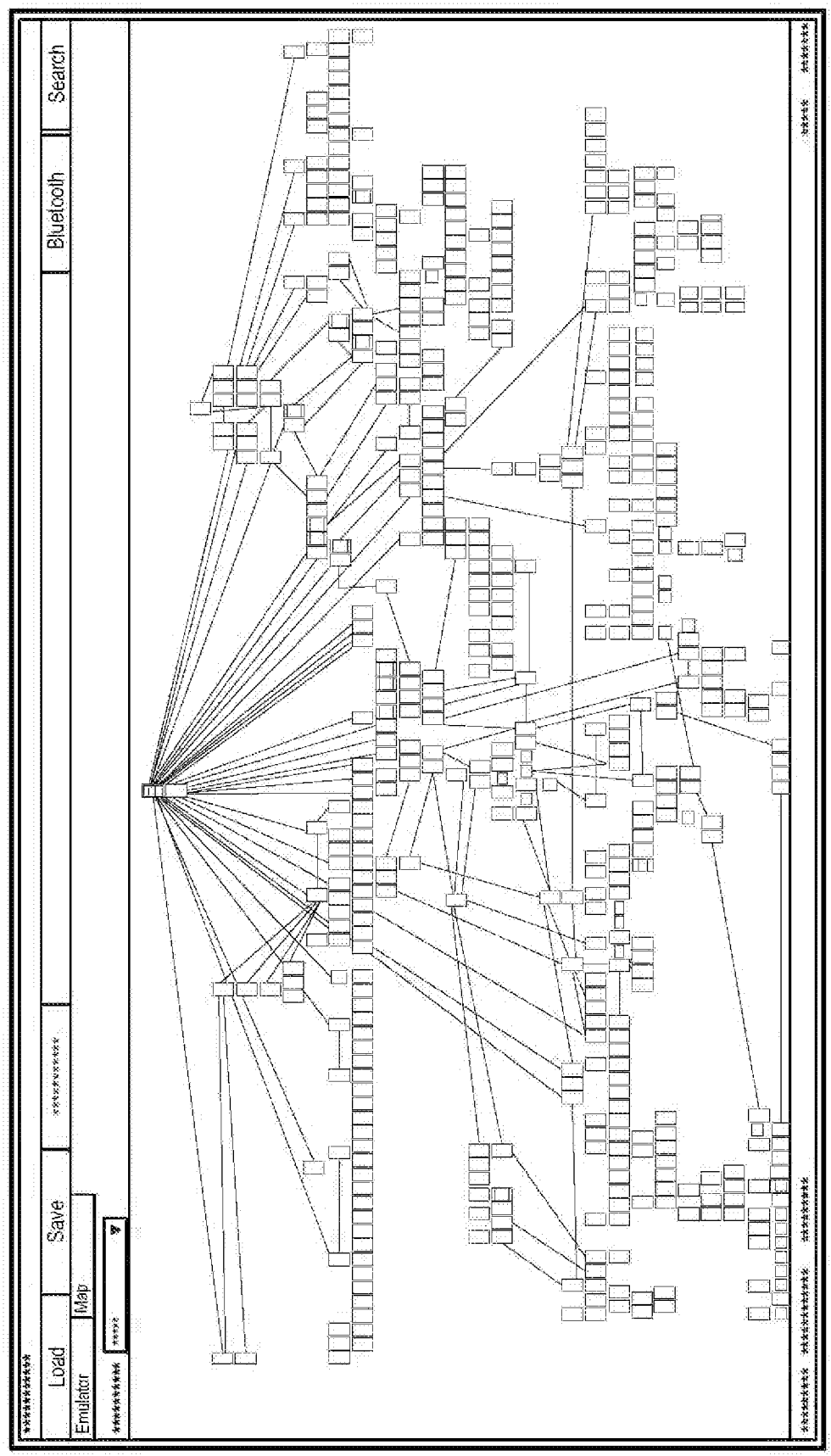
FIG. 4 shows an exemplary overview of a device navigational map.

FIG. 4 gives an exemplary view of a device navigational map. The Navigation Map is represented by a graph and the graph is defined as a list of vertices and a list of edges (each edge is a pair of vertices). In this context, the vertex encapsulates all the data for a particular screen. Each vertex could be a screen or an application or an icon within the device. The vertices are connected together by the edges. The edges define what action needs to be performed to navigate from one vertex to another. The navigational map as a whole provides a two dimensional view of the entire device software and information on how to navigate to different areas within the connected device. It also contains additional information about the connected device such as device make, model, OS version, software version and the like.

Figure 5A:
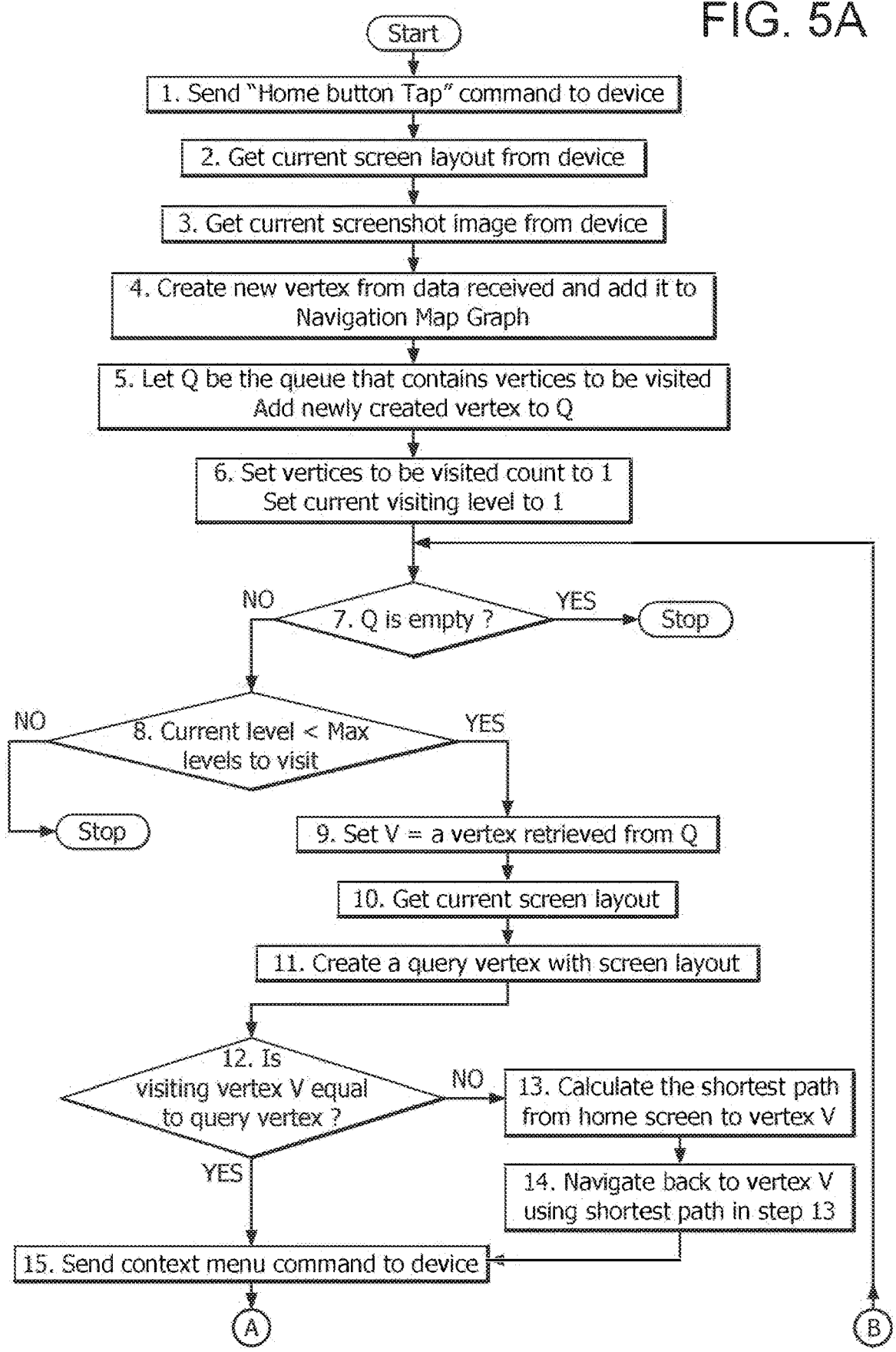
FIG. 5A and FIG. 5B describe a detailed call flow used in building a navigation map graph.
Figure 5B:
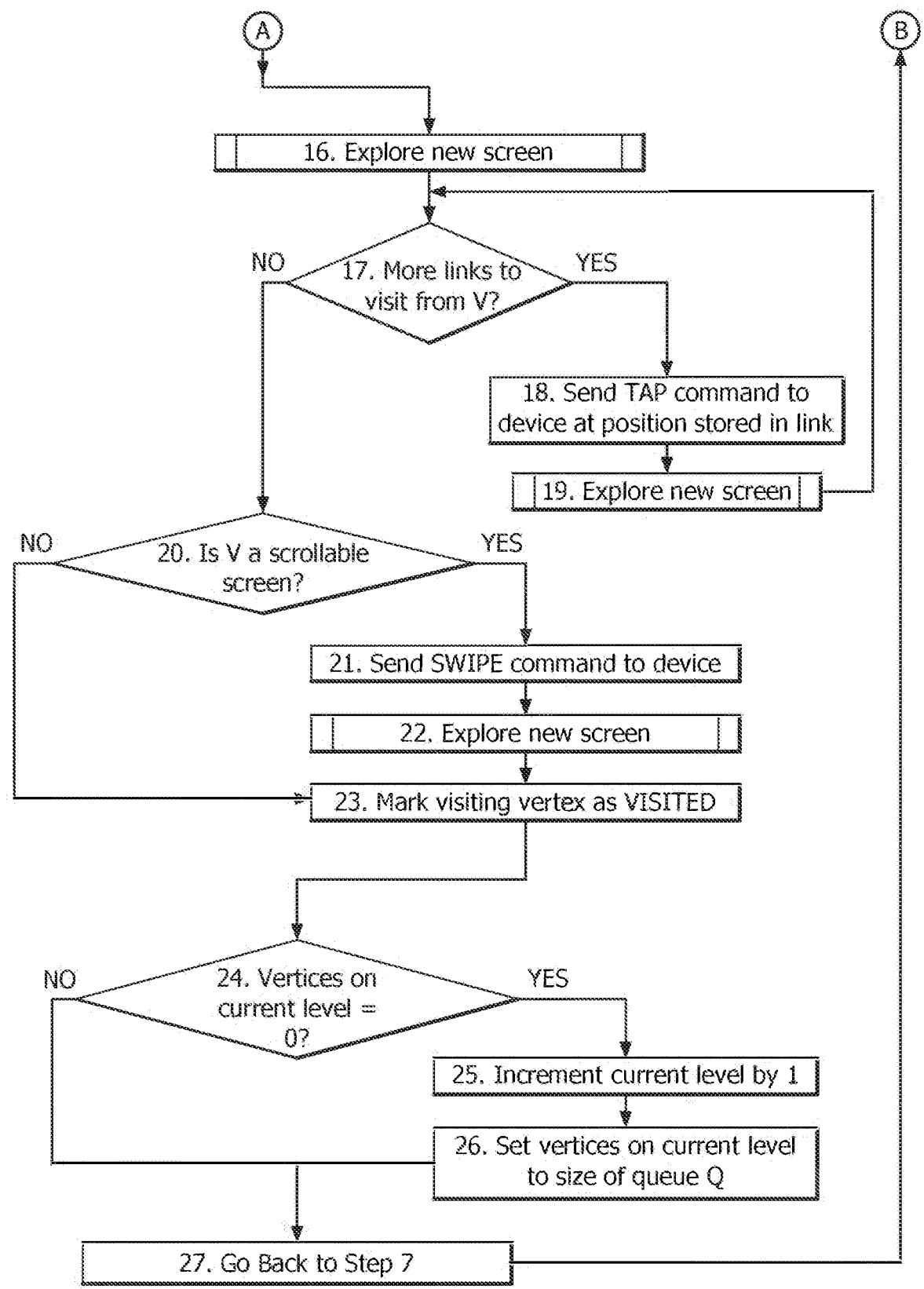

FIGS. 5A and 5B elaborate a detailed call flow involved in creating a new device navigational map on a target device, (a sample connected device). The navigational map builder performs the following actions. Initially, a "Home" button tap command is sent to the target device [1] to ensure that the NM graph is always built from a known starting point. A get current screen layout command is sent to the connected device [2]. Once a screen layout is received, a get current screen image command is sent to connected device [3]. Using the screen layout and screenshot, a new vertex is created and added to the navigational map graph [4]. This would form the first vertex within the NM graph. A queue Q is created to contain all vertices that need to be visited within the graph. A queue Q contains the list of vertices which are not visited yet and is dynamically expanded while scanning the connected device. The scanning is done once a specific scanning deep/depth level is reached. This level is provided as an input parameter to the algorithm. For instance, the home screen represents level 0, the apps icons represents level 1, the settings page represents level 2 and so on.

The newly created vertex from step 4 is added to Q [5]. The vertices to be visited count is set to 1, and the current depth or visiting level is set to 1 [6]. The NM builder now checks if Q is empty [7]. If the Q, is empty, the process is stopped and the building process is complete. If the Q is not empty, the Q is checked to see if the current depth or visiting level to be visited is less than the pre-defined maximum depth level to visit [8]. If not, the process is stopped and the building process is complete. A pre-defined maximum depth level could be set to ensure that the NM graph is manageable so as to be useful. If the current depth level is less than the maximum depth levels to visit, then a vertex V is de-queued from the Q [9]. The NM builder sends a request to the connected device for the current screen layout [10]. A query vertex is created with the screen layout [11]. A query vertex is a temporary vertex created from the current screen which is not attached to the current graph and is used to match the current screen against the current navigation map.

The NM builder then checks if the query vertex is the same as visiting vertex V [12], where a visiting vertex is the current vertex to be examined by the algorithm. At each step, the algorithm tries to discover the other unvisited screens that are reachable directly from the screen represented by the visiting vertex. If it's not the same, the NM builder calculates the shortest path from the home screen to the vertex V [13]. If then sends a command to the connected device to navigate back to vertex V using shortest path calculated in step 13 [14]. If the query vertex is equal to visiting vertex V, then a context menu command is sent to the connected device [15]. This will open the context menu on the connected device for the particular screen, which is one of the other unvisited screens.

Next, the NM builder will explore the new screen on the connected device [16]. The process involved in exploring a new screen is described in detail in FIG. 6. Once the new screen is explored, it is checked to determine if there are more links to be visited from vertex V [17]. If yes, then a TAP command, (a TAP command is equivalent to pressing a specific user element on the device screen (e.g. tap app icon)), is sent to the connected device at the position stored in the link [18]. The device layout for a particular screen will contain information about all links and its co-ordinates within the screen. The TAP command is received by the NM service and executed on the device. The NM builder explores the new screen opened by the tap action [19].

Once all the links within the screen are visited, a test is done to check if vertex V has scrollable elements on the screen [20]. If not, then the screen is marked as visited [23]. If there are scrollable elements within vertex V, then a SWIPE command is sent to the connected device [21]. The swipe command could consist of Swipe UP, Swipe Down, Swipe Left and Swipe Right sub commands. The NM service performs the swipe actions on the connected device. The new screen opened on the connected device is then explored by NM builder [22]. The visiting vertex V is then marked as Visited [23]. The NM builder then checks if the vertices on the current level is equal to 0 [24]. If yes, then the current level is incremented by 1 [25]. The vertices on the current level are set to the size of the queue Q [26]. Then the process is looped back to step 7. If the vertices on the current level is not equal to zero, then the process is automatically looped back to step 7 [27].

Figure 6:
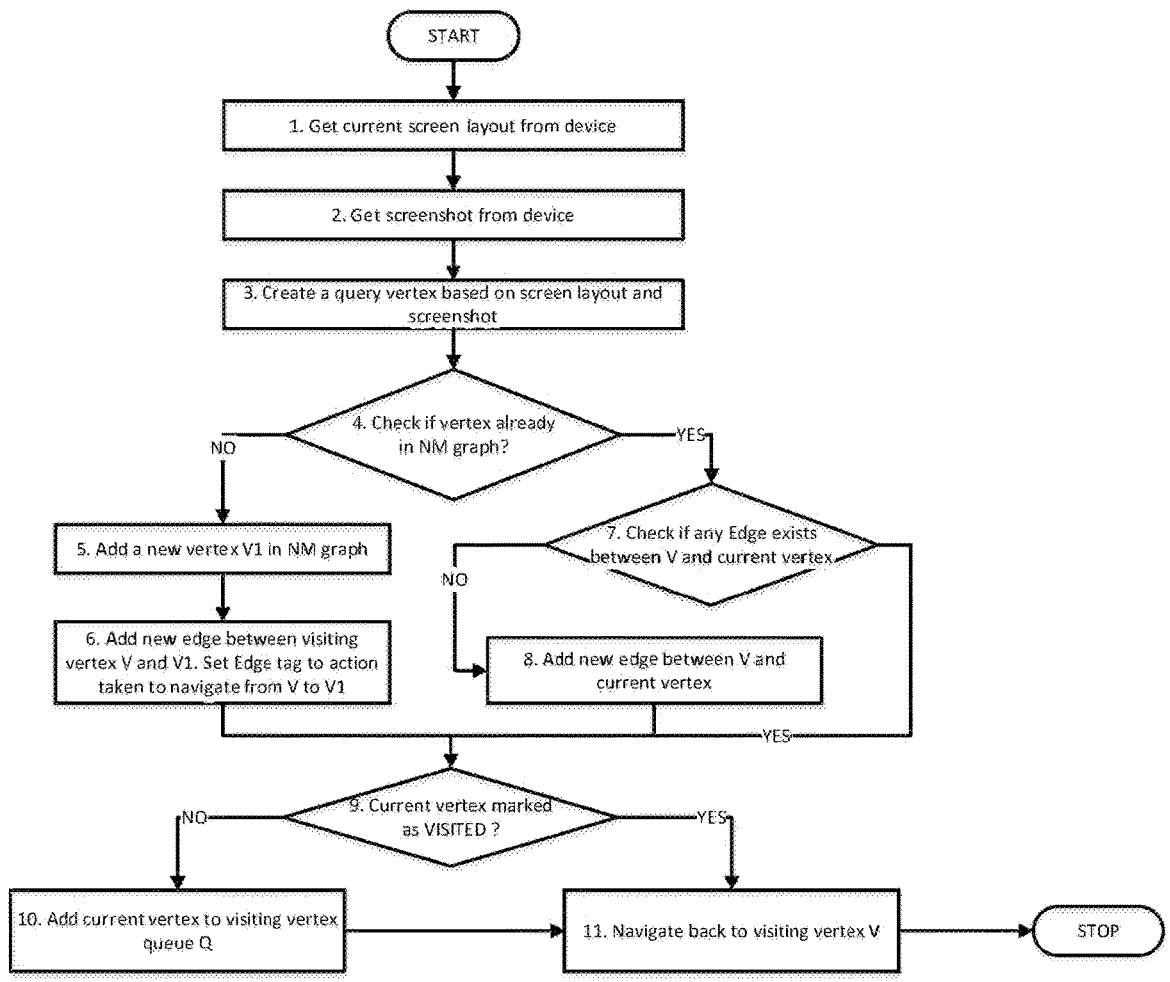
FIG. 6 describes a detailed call flow for the Explore new screen sub process.

FIG. 6 elaborates the process of exploring a new screen on the device. For example, while on the home screen, if clicking a particular co-ordinate on the connected device opens a new screen, that new screen is completely explored before moving back to the home screen. To explore a new screen, the NM builder sends a command to the connected device to get the current screen layout [1]. Once the current screen layout is received, the NM builder requests a screenshot of the current screen from the device [2]. A query vertex is created based on the screen layout and screenshot received from the connected device [3]. The NM builder then checks if the query vertex already exists in the NM graph [4]. The query vertex is matched with every other vertex within the NM graph. The matching is done taking into account many parameters like any visible texts on the vertex screen, any hidden texts on the screen, control types (clickable links or icons) and their positions within a screen, images and so on. If a matching vertex does not exist, then a new vertex V1 is created and added to the NM graph [5]. A new edge is added between the visiting vertex V and new vertex V1. The edge tag is set to the action that was performed to navigate from vertex V to V1 [6]. The action could be a tap, swipe or button action. Once the edge is created, a check is made to ensure the current vertex is marked as VISITED [9]. If a match is found in step 4, then a check is made to ensure that an edge exists between V and current vertex [7]. If not, a new edge is added between vertex V and current vertex [8]. Once the edge is created, a check is made to ensure the current vertex is marked as VISITED [9]. If an edge exists in step 7, a check is made to ensure the current vertex is marked as VISITED [9]. If the current vertex is not marked as visited, NM builder adds the current vertex to the visiting vertex queue Q [10]. It then sends a command to the connected device to navigate back to visiting vertex V [11]. If the current vertex is marked as visited, then the command is directly sent to the connected device to navigate back to visiting vertex V [11].

Figure 7:
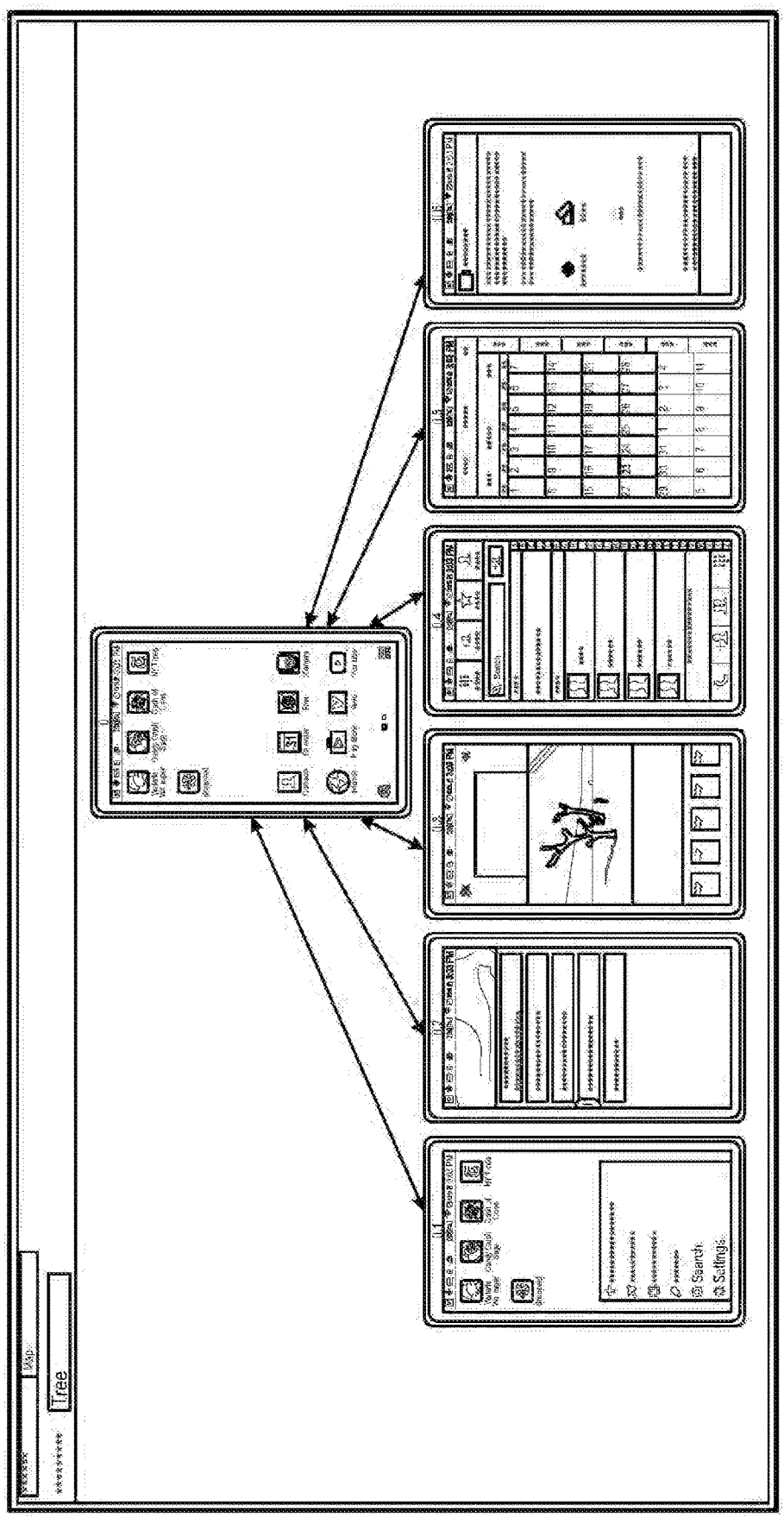
FIG. 7 shows a closer view of a device navigational map in a graphical representation.

FIG. 7 gives a closer view of a target (sample connected) device navigational map. The map can be viewed in any layout type like a tree layout, a circular layout or a link log layout. FIG. 7 shows a device navigational map in a tree layout. At the top of the tree is node 0 which is connected to multiple nodes using edges. In the sample, node 0 contains the information about the home screen of a connected device. Performing an action on the home screen like tapping on specific co-ordinates or swiping from left to right will allow for navigation to other connected nodes. For example, pressing the menu button on the connected device will allow navigation from the home screen to the settings menu slide as shown in node 0.1, tapping on the calendar icon will allow navigating to calendar application screen node 0.5 and tapping on the contacts icon will allow navigating to contact application screen node 0.4.

FIG. 8 shows the structure of the navigational map in a graph structure [800]. The graph consists of the following data: a list of all vertices within the graph [810], a list of all edges within the graph [820] and device information [830]. Device information contains detailed information about device hardware and software such as device make, model, operating system version, software version and firmware version.

Figure 9:
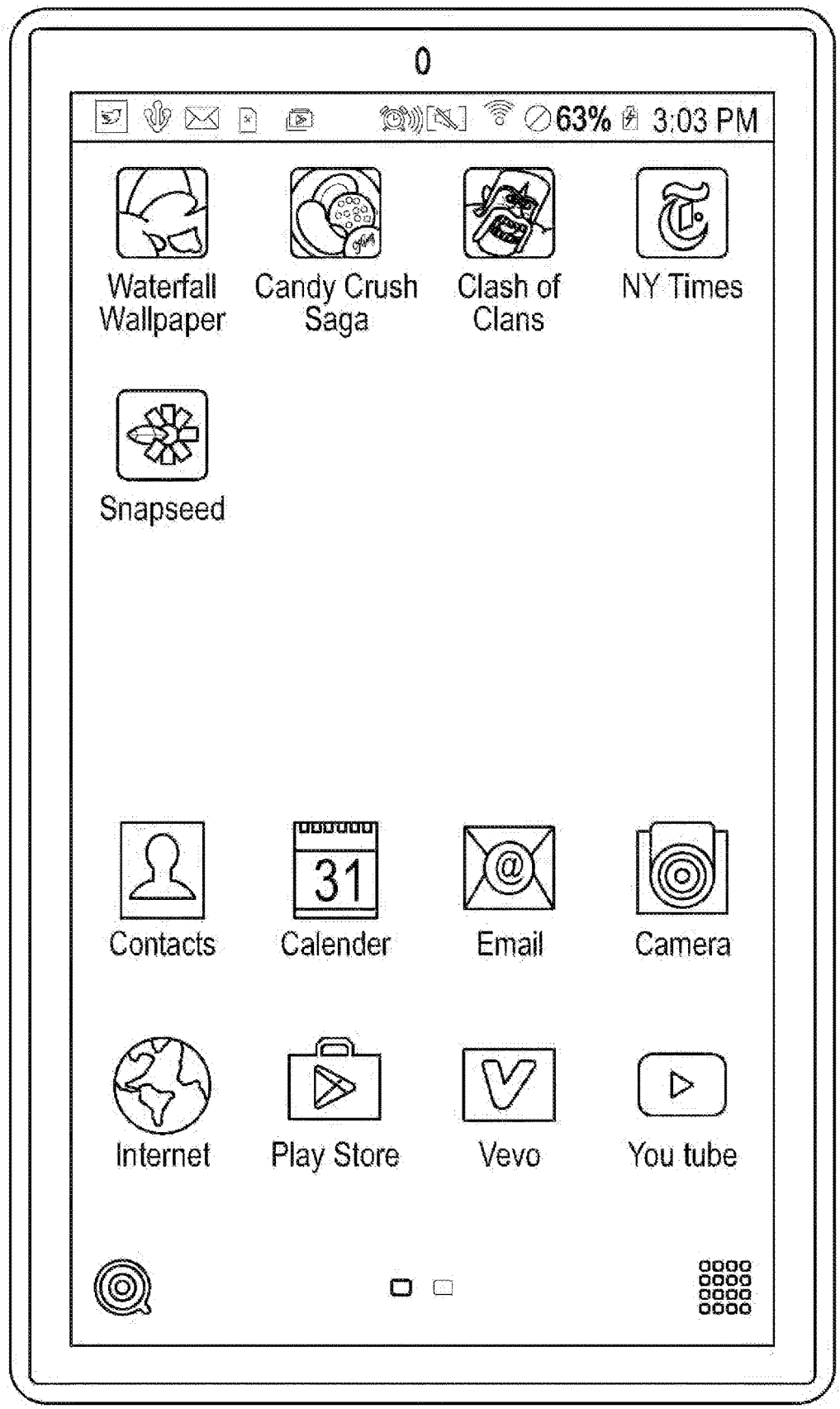
FIG. 9 shows a sample image of a vertex within a navigational graph.

A vertex is a node within the graph which represents the different screens within a device's user interface. A vertex might also represent different states of a single screen within a connected device as based on specific configurations made on the connected device. For example, a network settings screen with mobile data enabled might be different from one where mobile data is disabled. FIG. 9 shows a sample image of a vertex within a navigational graph. This specific vertex has a unique identifier 0 and represents the home screen of a connected device. This vertex also contains an image of the home screen in its default state.

Figure 10:
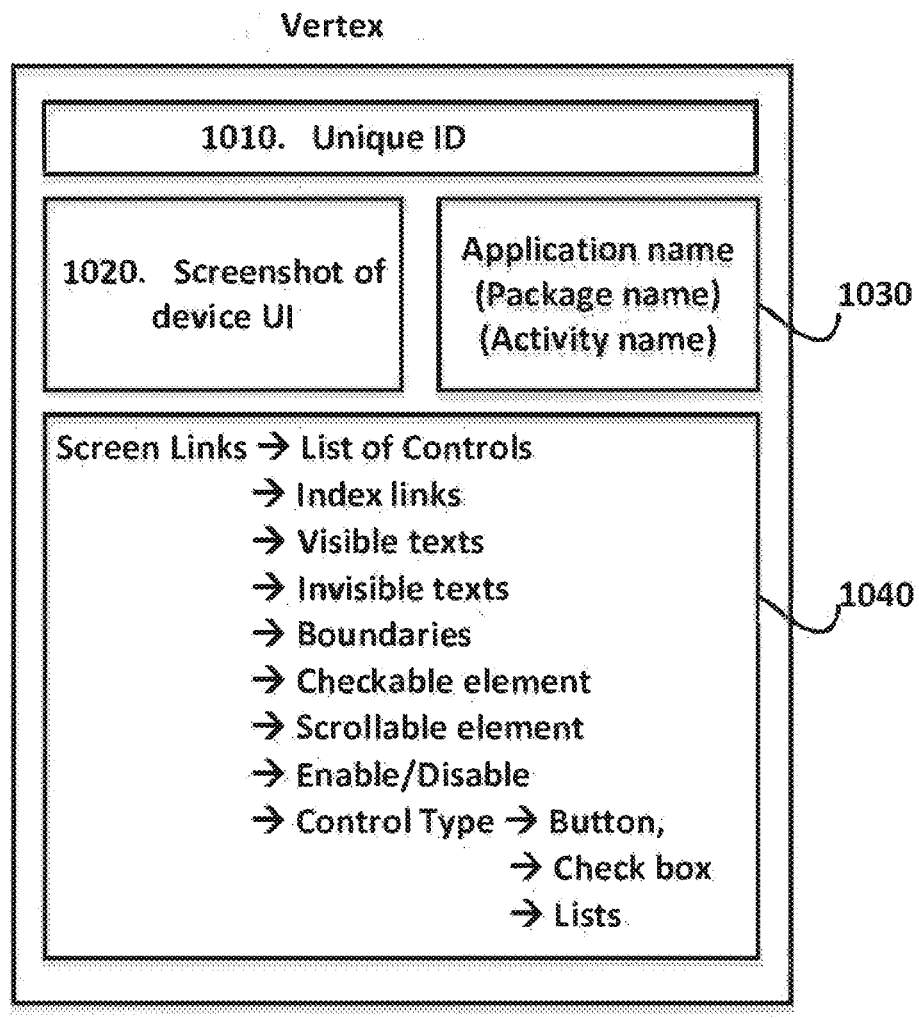
FIG. 10 shows an exemplary structure of a vertex within a navigational graph.

FIG. 10 describes the structure of a vertex within a navigational graph in detail. A vertex contains the following information: a unique id 1010, an image of the device screen currently in focus 1020, the application name 1030, which could also include the package name, and activity name and screen links 1040. The screen links 1040 contain the following information: a list of control buttons or actionable elements within the screen, link or index information, visible texts; invisible texts, boundaries of screen link which include the exact co-ordinates within the device screen, control type which specifies if the screen link is a button, check box or a list and information about the characteristics of the link like whether it can be enabled or disabled, checked or scrollable.

Figure 11:
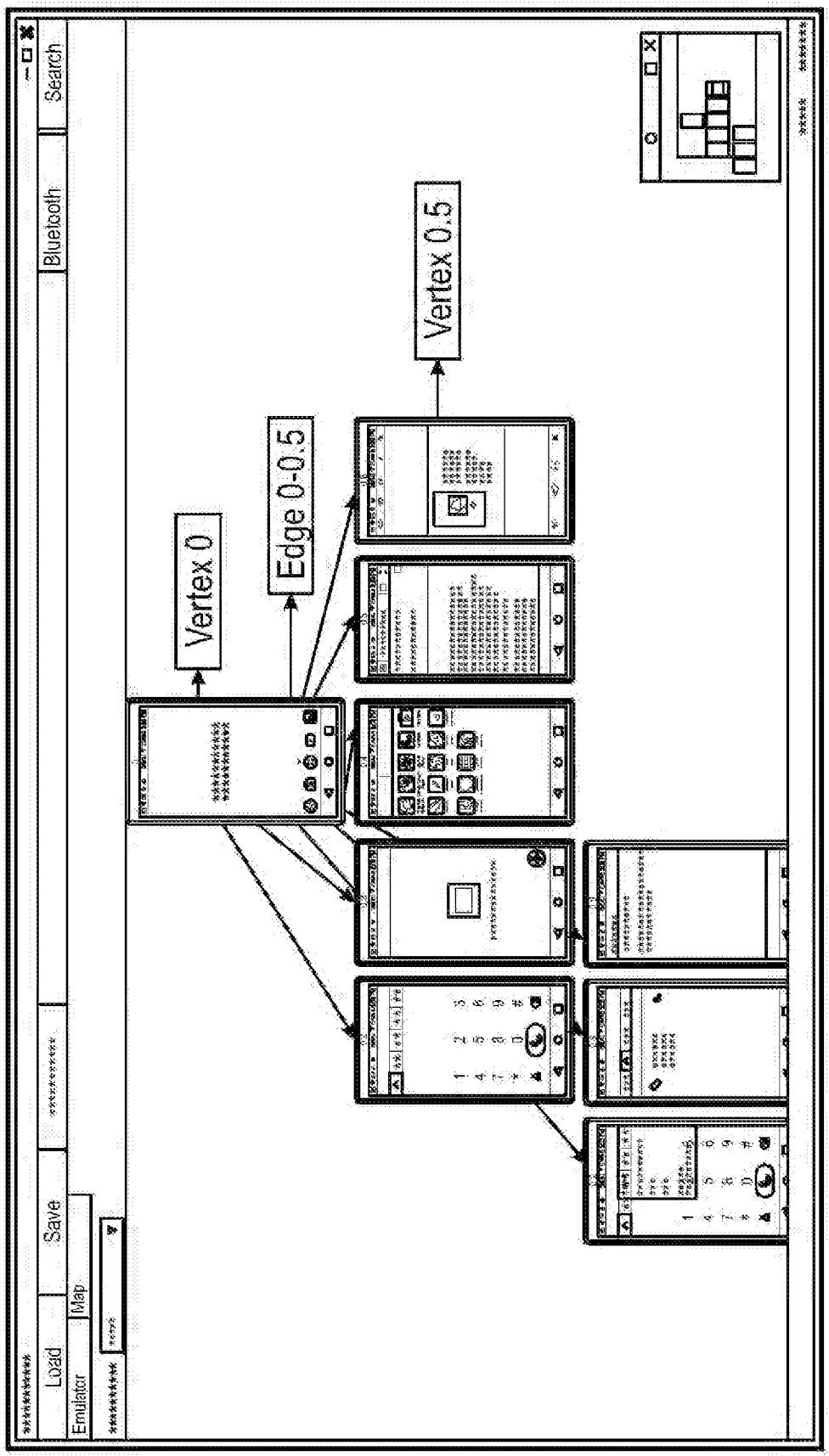
FIG. 11 shows a sample image of an edge with a navigational graph.

An edge is a directional link between two vertices. It contains information about how to navigate from one vertex to another and the action that needs to be performed to navigate from one vertex to another. FIG. 11 shows a sample edge between two vertices. The figure shows vertex with unique id 0 being connected bi-directionally to 5 other vertices with unique ids 0.2 and so on. Hovering over on an edge reveals the area of the connected device where an action needs to be taken to navigate from the source vertex to the destination vertex. As shown in this example, the edge 0-0.5 connects vertex 0 to vertex 0.5. Tapping on the email icon within the vertex 0 will allow the system to navigate from source vertex 0 to destination vertex 0.5. The edge 0.5-0 connects vertex 5 back to vertex 0.

Figure 12:
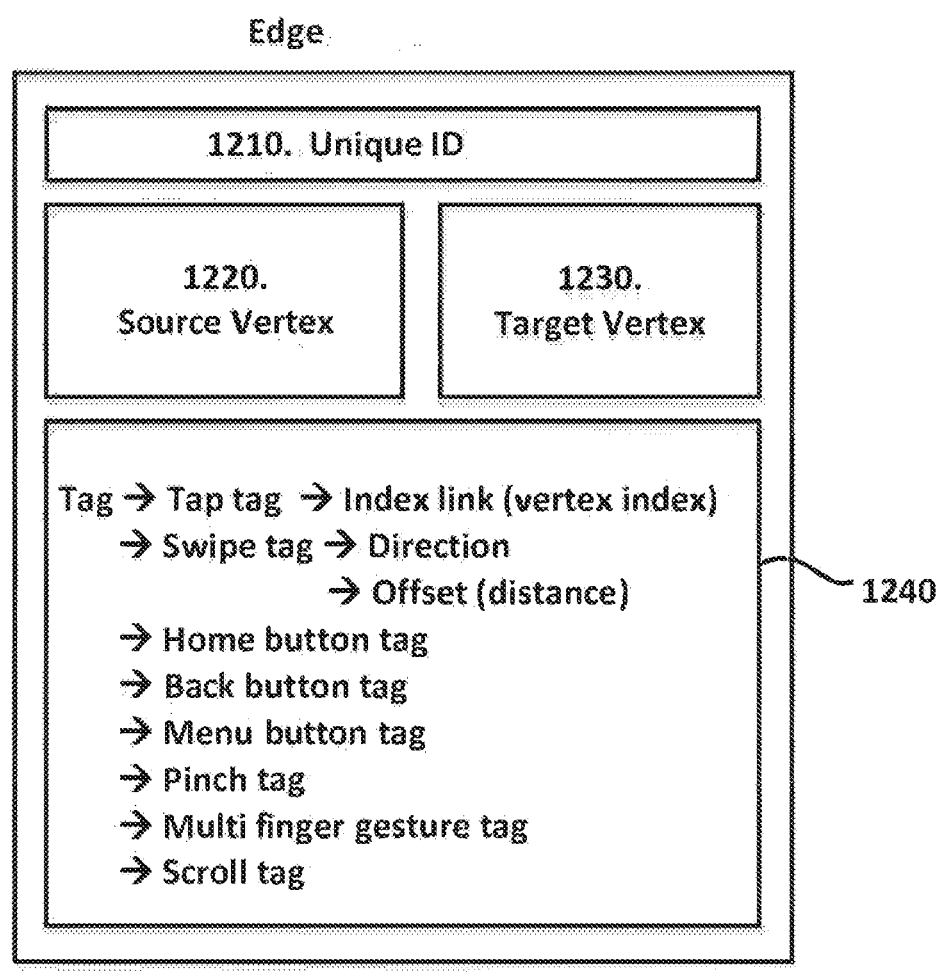
FIG. 12 shows an exemplary structure of an edge within a navigational graph.

FIG. 12 describes the structure of an edge within the navigational map. Each edge consists of the following parameters. A unique identifier 1210 which is used to identify each edge within the map, a source vertex id 1220 which describes the originating vertex of the edge within a map, a target vertex id 1230 which describes the destination vertex of the edge within a map and a tag 1240. A tag 1240 contains information on what action needs to be taken to navigate from a source vertex to a target vertex. A tag 1240 could be one or more of the following: tap tag, swipe tag, home button tag, back button tag, menu button tag, pinch tag, multi-finger gesture tag or a scroll tag.

Figure 13:
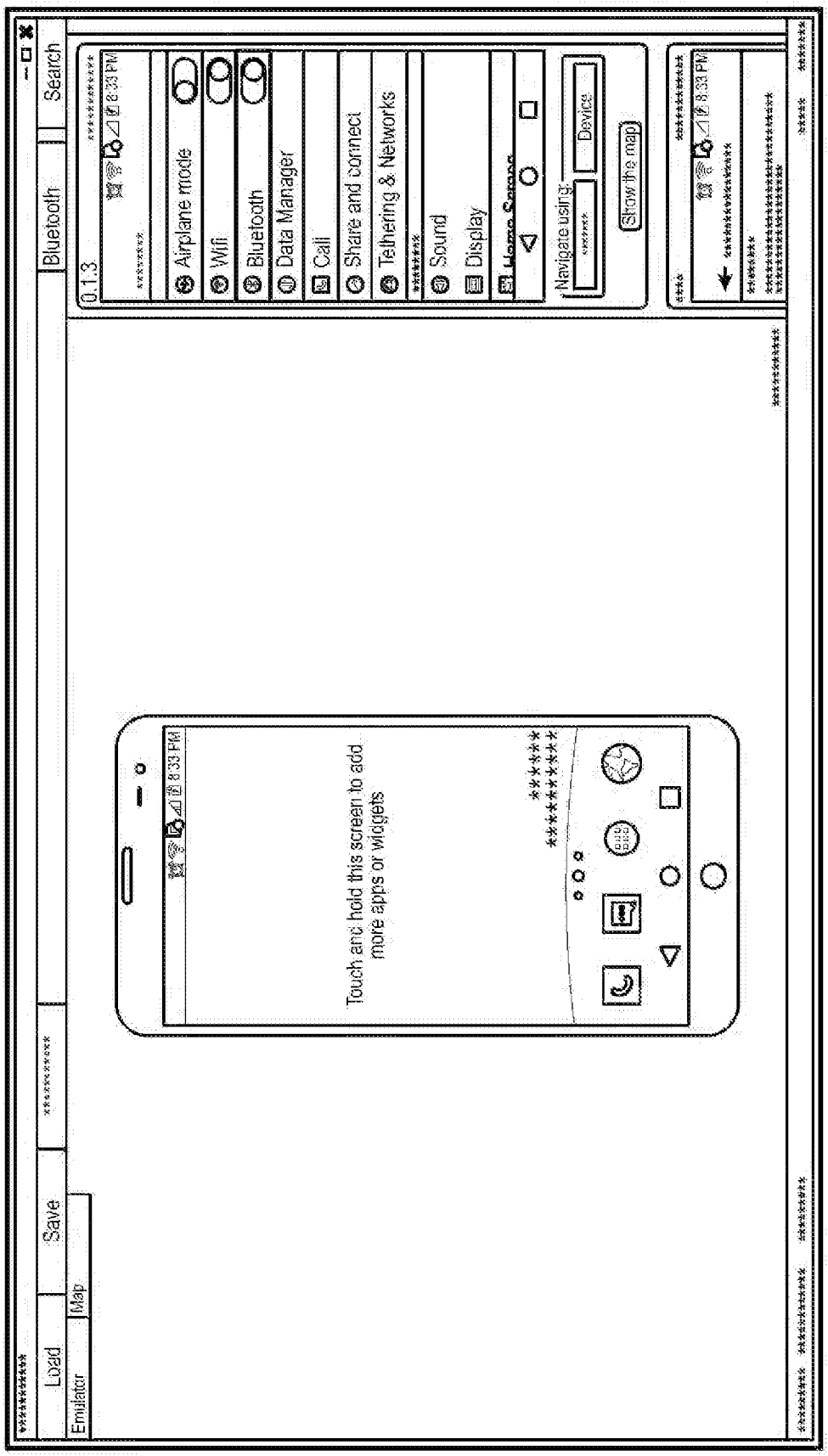
FIG. 13 shows a sample image of a device simulator built using a device navigational map.

FIG. 13 shows a sample image of a device navigational map being utilized as a simulator which can mimic the user interface, features and functionality of an actual connected device. Each of the vertices within the graph represents different screens on the device as well as its various states. Since the map also contains information on how to navigate from one screen to another and from one state to another state, the simulator can mimic the behavior of a physical connected device. For example, if a user taps on phone icon on the home screen, where home screen is a vertex and the phone icon is one of the screen links within the vertex, the user will be presented with the phone application screen which is another vertex within the graph. The home screen and phone application screen are connected by a unique edge which gets activated by a tap action on the phone icon. Since all visible text on a screen is also captured within the vertex, any component of the connected device which has a text associated with it can be searched within the simulator. For example, searching for text "Bluetooth" within the simulator will retrieve all screens within the device navigational map which contains the text Bluetooth.

Figure 14:
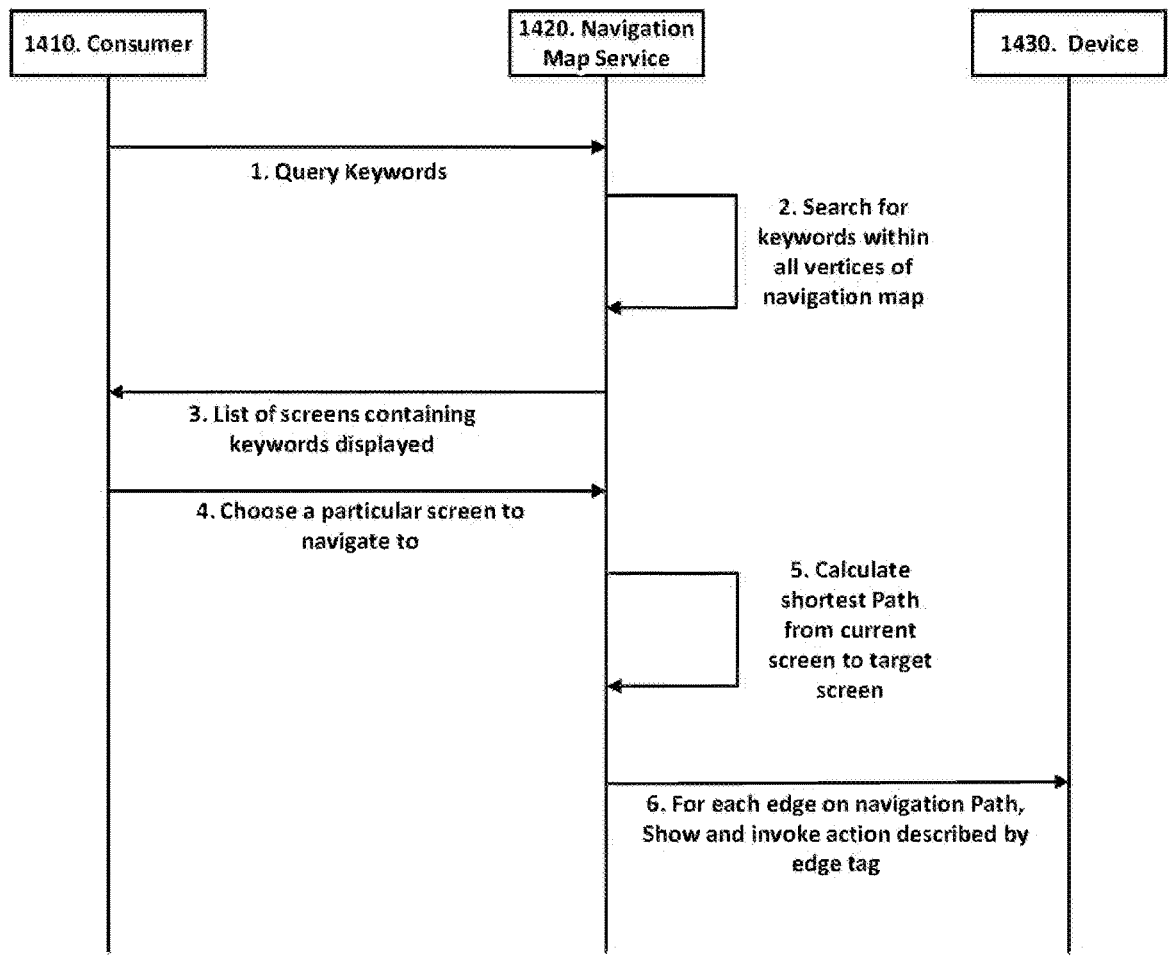
FIG. 14 describes the call flow for utilizing navigational maps in interactive device navigation.

FIG. 14 describes the use of a navigation map graph in an interactive guidance system. For the purpose of illustration, the figure describes the interaction between the following entities: Consumer 1410 is an end user of a connected device 1430 who is interactively being guided on the connected device 1430; Navigation map service 1420; and the connected device 1430. When a consumer 1410 needs assistance in accessing specific sections of the connected device 1430 or configuring device settings, the consumer 1410 will provide query keywords using audio input, text input or other input means, which is intercepted and processed by the navigation map service 1420 [1]. The navigation map service 1420 will search for the keyword within all vertices of the navigation map which has been downloaded from NM server for the particular connected device [2]. If a keyword match is found within the screens of vertices, a list of all screens containing the keyword is presented to consumer 1410 [3]. The consumer 1410 can choose the desired screen or settings page from the list presented [4]. The navigation map service 1420 will now assist consumer 1410 in navigating to the chosen screen. The NM Service 1420 will calculate the shortest path from the current screen on the connected device 1430 to the target screen [5]. The path to navigate from one screen to another might comprise one or more edges. For each edge on the navigation path, NM service will provide a visual guidance on the device user interface and command the connected device 1430 to perform actions described within each edge tag [6]. Consider the example of a consumer requesting to be navigated to the browser settings screen. The shortest path calculated to navigate to the browser setting screen from the home screen is to tap on the browser and tap on the menu icon. The NM service will command the device 1430 to first navigate to the browser screen by performing a tap action on the browser link element, where the Tap action is an edge tag between the source vertex home screen and the target vertex browser screen. Alternatively, the consumer 1410 might be presented with visual or audio instructions and requested to perform a tap action on the browser icon. Next, the NM service will command the connected device to navigate to a browser setting screen by automatically performing the tap action on the menu icon or request the consumer to perform the action.

In a use implementation, when Navigation Map Service 102 is enabled, Navigation Map Service 102 can record the user activity on the connected device. The user activity can then be matched against the navigation map. This matching can reveal, for example, how long the user has spent on a specific application, how long the user has spent on a specific screen within an application and what kind of actions he/she has taking, (e.g., button clicks, input, turn on/off features, scrolling etc).

While detailed embodiments of the instant invention are disclosed herein, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the technology to variously employ the present invention in virtually any appropriately detailed structure.

Although features and elements are described above in particular combinations, each feature or element can be used alone without the other features and elements or in various combinations with or without other features and elements.

The invention claimed is:

1. A navigation device comprising a processor and a memory, wherein the processor executes a navigation map service stored in the memory to communicate to a user of a user device, actions to be performed at the user device for navigating from a current screen of the user device to a destination screen of the user device, by performing the following steps:
upon receiving a query keyword entered by the user, searching for the query keyword in a navigational map, wherein the navigational map includes a plurality of screens of the user device as nodes of the navigational map and further includes edges between the nodes, each of the edges being associated with at least one action that causes the user device to navigate from one of the plurality of screens to another one of the plurality of screens;
presenting a subset of the plurality of screens to the user, each screen of the subset of screens including the query keyword;
in response to receiving a selection by the user of one of the presented screens as the destination screen, calculating a path from the current screen to the destination screen using the navigational map, the path including a subset of the edges, and determining with the subset of the edges a plurality of actions to be performed at the user device to navigate from the current screen to the destination screen; and
transmitting at least one message to the user device describing the determined plurality of actions to be performed.

2. The navigation device of claim 1, wherein the steps further include:
before calculating the path, retrieving the navigational map from a navigation map server remote from the navigation device.

3. The navigation device of claim 2, wherein the steps further include:
causing a copy of the navigational map stored by the navigation device to be synchronized with another copy of the navigational map stored by the navigation map server.

4. The navigation device of claim 1, wherein the steps further include:
before calculating the path, identifying a screen that is missing from the navigational map; and
adding the missing screen to the navigational map as a new node, wherein path from the current screen to the destination screen passes through the new node.

5. The navigation device of claim 1, wherein the steps further include:
identifying at least a portion of the current screen comprising the query keyword, based at least in part on an image of the current screen and screen layout information associated with the current screen; and
causing the at least a portion of the current screen comprising the query keyword to be highlighted.

6. The navigation device of claim 1, wherein the steps further include:
adding, to the at least one message, instructions to invoke a user interface (UI) element of the current screen.

7. The navigation device of claim 6, wherein the steps further include:
adding, to the at least one message, instructions to tap the UI element or instructions to scroll through the current screen by swiping up, down, left, or right on the current screen.

8. A method for communicating to a user of a user device, actions to be performed at the user device for navigating from a current screen of the user device to a destination screen of the user device, the method comprising:
upon receiving a query keyword entered by the user, searching for the query keyword in a navigational map, wherein the navigational map includes a plurality of screens of the user device as nodes of the navigational map and further includes edges between the nodes, each of the edges being associated with at least one action that causes the user device to navigate from one of the plurality of screens to another one of the plurality of screens;
presenting a subset of the plurality of screens to the user, each screen of the subset of screens including the query keyword;
receiving a selection by the user of one of the presented screens as the destination screen;
in response to receiving the selection of the one of the presented screens, calculating a path from the current screen to the destination screen using the navigational map, the path including a subset of the edges, and determining with the subset of the edges a plurality of actions to be performed at the user device to navigate from the current screen to the destination screen; and
transmitting at least one message to the user device describing the determined plurality of actions to be performed.

9. The method of claim 8, further comprising:
before calculating the path, retrieving the navigational map from a navigation map server.

10. The method of claim 9, further comprising:
causing a copy of the navigational map stored by a navigation device remote from the navigation map server, to be synchronized with another copy of the navigational map stored by the navigation map server.

11. The method of claim 8, further comprising:
before calculating the path, identifying a screen that is missing from the navigational map; and
adding the missing screen to the navigational map as a new node, wherein the path from the current screen to the destination screen passes through the new node.

12. The method of claim 8, further comprising:
identifying at least a portion of the current screen comprising the query keyword, based at least in part on an image of the current screen and screen layout information associated with the current screen; and
causing the at least a portion of the current screen comprising the query keyword to be highlighted.

13. The method of claim 8, further comprising:
adding, to the at least one message, instructions to invoke a user interface (UI) element of the current screen.

14. The method of claim 13, further comprising:
adding, to the at least one message, instructions to tap the UI element or instructions to scroll through the current screen by swiping up, down, left, or right on the current screen.

15. A non-transitory, computer-readable medium embodying a program that, when executed in a navigation device, causes the navigation device to perform a method for communicating to a user of a user device, actions to be performed at the user device for navigating from a current screen of the user device to a destination screen of the user device, wherein the method comprises:
upon receiving a query keyword entered by the user, searching for the query keyword in a navigational map, wherein the navigational map includes a plurality of screens of the user device as nodes of the navigational map and further includes edges between the nodes, each of the edges being associated with at least one action that causes the user device to navigate from one of the plurality of screens to another one of the plurality of screens;
presenting a subset of the plurality of screens to the user, each screen of the subset of screens including the query keyword;
in response to receiving a selection by the user of one of the presented screens as the destination screen, calculating a path from the current screen to the destination screen using the navigational map, the path including a subset of the edges, and determining with the subset of the edges a plurality of actions to be performed at the user device to navigate from the current screen to the destination screen; and
transmitting at least one message to the user device describing the determined plurality of actions to be performed.

16. The non-transitory, computer-readable medium of claim 15, wherein the method further comprises:
before calculating the path, retrieving the navigational map from a navigation map server remote from the navigation device.

17. The non-transitory, computer-readable medium of claim 16, wherein the method further comprises:
causing a copy of the navigational map stored by the navigation device to be synchronized with another copy of the navigational map stored by the navigation map server.

18. The non-transitory, computer-readable medium of claim 15, wherein the method further comprises:
before calculating the path, identifying a screen that is missing from the navigational map; and
adding the missing screen to the navigational map as a new node, wherein the path from the current screen to the destination screen passes through the new node.

19. The non-transitory, computer-readable medium of claim 15, wherein the method further comprises:
identifying at least a portion of the current screen comprising the query keyword, based at least in part on an image of the current screen and screen layout information associated with the current screen; and
causing the at least a portion of the current screen comprising the query keyword to be highlighted.

20. The non-transitory, computer-readable medium of claim 15, wherein the method further comprises:
adding, to the at least one message, instructions to invoke a user interface (UI) element of the current screen.

* * * * *